United States Patent [19]
Turner et al.

[11] 3,899,538
[45] Aug. 12, 1975

[54] ACID-CATALYZED DECOMPOSITION OF ALIPHATIC HYDROPEROXIDES

[75] Inventors: John O. Turner, Shavertown; Norman C. Deno, State College, both of Pa.

[73] Assignee: Sun Ventures, Inc., St. Davids, Pa.

[22] Filed: Jan. 8, 1974

[21] Appl. No.: 431,634

Related U.S. Application Data

[63] Continuation-in-part of Ser. No. 98,035, Dec. 14, 1970, abandoned, which is a continuation-in-part of Ser. No. 54,578, July 13, 1970, abandoned.

[52] U.S. Cl. ...... 260/593 R; 260/632 R; 260/601 R
[51] Int. Cl. ............................................. C07c 49/04
[58] Field of Search ...................... 260/593 R, 632

[56] References Cited
FOREIGN PATENTS OR APPLICATIONS
2,134,292   1/1972   Germany .......................... 260/593

OTHER PUBLICATIONS
Hoffman, J.A.C.S., Vol. 79, 3139–3140, (1955).

*Primary Examiner*—Bernard Helfin
*Assistant Examiner*—James H. Reamer
*Attorney, Agent, or Firm*—George L. Church; Donald R. Johnson; Stanford M. Back

[57] ABSTRACT

Tertiary aliphatic hydroperoxides and peroxides in the presence of highly concentrated acid catalyst are converted to a mixture of ketones and alcohols in substantially quantitative yields. The corresponding secondary aliphatic hydroperoxides yield product mixtures of alcohols, ketones and aldehydes in varying proportions, depending upon the acid concentration employed.

5 Claims, No Drawings

ACID-CATALYZED DECOMPOSITION OF ALIPHATIC HYDROPEROXIDES

CROSS-REFERENCE TO RELATED APPLICATION

This application is a continuation-in-part of U.S. Ser. No. 98,035 filed Dec. 14, 1970 now abandoned, which in turn is a continuation-in-part of U.S. Ser. No. 54,578 filed on July 13, 1970 now abandoned, in the name of John O. Turner and Norman C. Deno and both entitled "ACID-CATALYZED DECOMPOSITION OF ALIPHATIC HYDROPEROXIDES."

BACKGROUND OF THE INVENTION

This invention relates to a novel process for the preparation of ketones or aldehydes, and alcohols. More particularly, this invention relates to a process for the preparation of high yields of aliphatic alcohols and ketones by reacting tertiary aliphatic hydroperoxides and peroxides with a highly concentrated acid catalyst. In a further embodiment, secondary aliphatic hydroperoxides have been found to yield mixtures of alcohols, aldehydes and ketones of varying concentrations, depending upon the acid concentration employed.

Certain prior art teachings have shown that alkyl or aromatic hydroperoxides may be contacted with acids to form various reaction products, including alcohols and ketones, but the results have, at best, been characterized by low yields and mixtures of many different products. Thus, for example, Leffler, Chem. Revs. 45, 385 (1949), suggested that the only products obtainable from the action of acids on t-butylhydroperoxide would be isobutylene and hydrogen peroxide. Maslennikov et al., Tr. Khim i Khim Ternol, 59 (1965), on the other hand, reacted t-butylhydroperoxide with benzene-sulfonic acid to obtain less than 10 percent each of acetone and methanol. Similarly, Hoffman et al., J. Am. Chem. Soc., 77, 3139 (1955) prepared neopentyl alcohol and acetone from isooctyl hydroperoxide using 65 to 70 percent $H_2SO_4$, but the yield of both of these products together was only about 40 percent. Finally, Turner et al., in copending application U.S. Ser. No. 2,681, filed Jan. 13, 1970, now U.S. Pat. No. 3,653,832, disclosed that when t-butylhydroperoxide was contacted with 50 to 60 weight percent sulfuric acid there was obtained a mixture of di-t-butylperoxide and hydrogen peroxide. It was also found that at 10 to 20 weight percent concentration of sulfuric acid, no reaction whatsoever took place.

Using aromatic hydroperoxides as starting materials, Davies et al., J. Chem. Soc., 2204 (1954) reported that xanthhydryl peroxide was obtained by contacting glacial acetic acid with xanthhydryl hydroperoxide. Also, it is well known that cumene hydroperoxide forms a mixture of phenol and acetone using low acid concentrations, and essentially unusable decomposition products at high acid concentrations, i.e. at concentrations of above about 80 percent. See also, J. Chem. Soc., 3917 (1956) which indicates that if cumene were treated under strongly acidic conditions the ring would be extensively sulfonated.

Thus, the possibility of obtaining high yields of ketones, aldehydes and alcohols from aliphatic hydroperoxides using concentrated acid catalysts is neither taught nor suggested by the prior art. Rather, the effect of concentrated acids on aromatic hydroperoxides suggests a contrary result, as does the fact that lower concentrations of acids on aliphatic hydroperoxides yield hydrogen peroxide and di-alkylperoxides.

SUMMARY OF THE INVENTION

In accordance with the present invention, it has now been found that when tertiary aliphatic hydroperoxides and peroxides are contacted with a highly concentrated acid catalyst, there is obtained a mixture of ketones and alcohols in high yields.

It has further been found that when secondary aliphatic hydroperoxides are reacted with varying concentrations of acid, the composition of the product mixture comprising alcohols, ketones, and aldehydes, is also varied markedly.

DESCRIPTION OF THE INVENTION

The reaction of the tertiary aliphatic hydroperoxide with the acid may be conveniently carried out by slowly adding the hydroperoxide (or corresponding peroxide) to the concentrated acid, preferably dropwise, at a temperature of about 0° to 20°C, and preferably from 0° to 10°C in order to control this highly exothermic reaction. Under these conditions, the reaction takes place virtually instantaneously. Under these conditions, also, the ratio of starting material to acid is not critical except for the fact that the acid should be maintained in substantial excess of the hydroperoxide as it is added to the acid in order that its concentration not fall below about 75 percent. Desirably, the acid concentration should be maintained at about 80 to 96 percent, and most preferably at concentrations of at least about 90 percent when the starting material is a tertiary aliphatic hydroperoxide, although oleum solutions may be employed if desired. At concentrations below about 75 percent, when starting with an hydroperoxide, increasing amounts of the corresponding peroxides are formed.

The acids which may be used in the process of this invention include hydrochloric and sulfuric, as well as fluorosulfonic acid, acid-treated molecular sieves and the like. Of these, sulfuric acid and oleum are preferred.

The tertiary aliphatic hydroperoxide and peroxide starting materials include those compounds having from about 3 to 12 carbon atoms. The tertiary alkyl hydroperoxides are preferred since they are generally more reactive than the secondary compounds. Typical amongst the tertiary alkyl hydroperoxides are such compounds as t-butylhydroperoxide, t-pentylhydroperoxide, isooctyl hydroperoxide, and the like.

When these compounds are treated in accordance with this process there are obtained the corresponding ketones and alcohols, as for example, t-butylhydroperoxide or -peroxide yields acetone and methanol, while t-pentylhydroperoxide or -peroxide yields acetone and ethanol.

In a further embodiment of this invention it has been found that secondary aliphatic hydroperoxide may also be reacted with concentrated acids of at least about 70 percent concentration to obtain a product mixture of alcohols, ketones and aldehydes. However, unlike the tertiary aliphatic hydroperoxides, the type of compound and the proportions thereof vary markedly depending upon the acid concentration employed, as will be seen from the examples below.

The reaction employing these secondary aliphatic hydroperoxides is carried out in the same manner, with the same conditions and with the same acids as in the case of the tertiary compounds. That is to say, the process is generally carried out by adding the hydroperoxide dropwise into the acid at a temperature of from 0° to 20°C. The ratio of hydroperoxide to acid is not critical but preferably the acid should be present in substantial excess of the hydroperoxide to maintain an acid concentration of at least 70 percent, and preferably above 85 percent up to 100 percent, or in the case of sulfuric acid, in the form of oleum.

Again, the acids may include hydrochloric, sulfuric, fluorosulfonic acid and the like. Sulfuric acid is preferred.

The secondary aliphatic hydroperoxides, and preferably the alkyl hydroperoxides, include compounds having from about 3 to 12 carbon atoms. Typical amongst these are such compounds as 2-butylhydroperoxide, 2-pentylhydroperoxide, 3-pentylhydroperoxide and the like.

When these compounds are reacted with a concentrated acid of at least about 70–75 percent, and preferably higher, there are obtained not only alcohols and ketones, but in some cases, as described below, aldehydes as well. For example, 3-pentylhydroperoxide or -peroxide yields propanal, 3-pentanone, and ethanol. It has been determined that the reason for this is that such a product mixture is the result of both hydrogen and alkyl migration. It has further been found that the relative proportions of these products may be varied by varying the acid concentration. Thus, for example, using 96 percent sulfuric acid, in the case of 2-butylhydroperoxide, there is obtained a 48:48:4 percent yield of 2-butanone; ethanol and acetaldehyde mixture; and methanol and propanal mixture respectively; whereas, for example, using 70 percent acid there is obtained an 82:18 yield 2-butanone and an ethanol-acetaldehyde mixture respectively; with no products formed as a result of methyl migration. As stated above, unlike tertiary aliphatic hydroperoxides, the reaction of secondary hydroperoxides with acids thus varies with acid concentration and, depending upon the nature of the starting material, will produce aldehydes as well as alcohols and ketones.

It will be understood that in each case where an alcohol is formed, it is generally recovered as a salt corresponding to the acid employed. Thus, for example, when using sulfuric acid the ethanol is formed as ethyl hydrogen sulfate. The product mixture of ketones, aldehydes and alcohols may, if desired, be readily separated by treating the reaction mixture with a strongly alkaline material such as sodium or potassium hydroxide, followed by distilling and/or extracting and distilling the ketones from the alcohols.

In still another embodiment of this process, it has been found that when the acid catalyst employed is a peracid of the same concentrations as described above, such as persulfuric acid or a mixture of e.g. $K_2S_2O_8$ and $H_2SO_4$, it is possible to form the desired hydroperoxide starting material in situ from the corresponding alcohol. Thus, for example, when contacting t-butyl alcohol with a molar equivalent of persulfuric acid, there is obtained a mixture of acetone and methanol. It has also been found, in accordance with this process, that when an excess of the peracid is used, and preferably at least two moles of acid, the acetone is further converted to acetic acid and additional methanol.

It will be understood that inasmuch as the process of this further embodiment involves the formation of hydroperoxide intermediates, in situ, that therefore the above-mentioned distinction between the tertiary alkyl hydroperoxides and secondary alkyl hydroperoxides applies equally to the reaction involving the corresponding alcohols. That is to say, when tertiary alkyl alcohols are reacted with peracids at concentrations of at least about 90 percent, based on the weight of the total reaction mixture, the products obtained are ketones and alcohols, while the products of the corresponding secondary alkyl alcohols with a peracid of at least 70 percent concentration are ketones, aldehydes, and alcohols.

The following specific examples will further serve to illustrate the nature, operation and advantages of the present invention. All percentages are on a weight basis. The reported yields are based on percent conversion of the hydroperoxide starting material.

In these examples, Examples 1–7 represent reactions employing tertiary aliphatic hydroperoxides, while Examples 8 and 9 represent the results obtained from secondary hydroperoxides.

EXAMPLE 1

The following comparative example illustrates the results obtained by contacting an hydroperoxide with 50 weight percent concentration of $H_2SO_4$:

Nine grams (0.1 moles) of t-butylhydroperoxide are added to 25 cc of 50 weight percent aqueous $H_2SO_4$ and stirred at 50°C for 15 hours. Phase separation yields 6.75 g. (0.046 m) of di-t-butylperoxide (92 percent of theory) and a water white acid phase.

EXAMPLE 2

Four and one-half grams (0.05 moles) of t-butylhydroperoxide are added dropwise with stirring to 12 cc of 96 percent $H_2SO_4$ while maintained the temperature below 15°C. The hydroperoxide rearranges to give a 96 percent yield of acetone and methanol (analyzed quantitatively by NMR spectroscopy).

In accordance with the foregoing procedure, but substituting t-pentylhydroperoxide for t-butylhydroperoxide, there is obtained a mixture of acetone and ethanol in 84 percent yield, together with lesser amounts of methylethyl ketone and methanol.

Also, in accordance with the foregoing procedure, but substituting isooctylhydroperoxide for t-butylhydroperoxide, there is obtained a mixture of neopentyl alcohol and acetone in an 85 percent yield.

EXAMPLE 3

Seven and three tenths grams (0.05 moles) of di-t-butylperoxide are added dropwise with stirring to 12 cc of 96 percent sulfuric acid while maintaining the temperature below 15°C. The peroxide reacts in a manner to yield 0.049 moles of both acetone and methanol. The remaining part of the peroxide molecule evolves as isobutene. When run under conditions which prevented loss of isobutene, isobutene polymerization and rearrangement products (cycloallylic carbonium ions) are also detected in the NMR spectrum.

In accordance with the foregoing procedure, but substituting di-t-pentylperoxide for t-butylperoxide, there is obtained predominantly a mixture of ethanol and acetone.

EXAMPLE 4

When the procedure of Example 3 is repeated but 120 percent fuming $H_2SO_4$ is substituted for 96 percent $H_2SO_4$, the same products are obtained, i.e. acetone and methanol, together with some isobutene.

EXAMPLE 5

In accordance with the procedures of Example 2, but substituting fluorosulfonic acid for sulfuric acid, there is obtained a mixture of acetone and methanol in 96 percent yield.

Similarly, when perchloric acid is substituted for sulfuric acid in Example 2, a high yield of acetone and methanol is once again obtained.

EXAMPLE 6

Addition of 0.15 grams of t-butyl alcohol to 2 moles of a $K_2S_2O_8$-$H_2SO_4$ reagent (made by dissolving 10 grams of $K_2S_2O_8$ in 20 moles of 96 percent $H_2SO_4$) yields predominantly acetone and methanol (as methyl hydrogen sulfate) as shown by NMR spectra.

In accordance with the foregoing procedure, but starting with a molar excess of acid reagent, there is obtained a mixture of acetone, methanol, acetic acid and some small amounts of methyl acetate, as shown by the NMR spectrum.

EXAMPLE 7

In accordance with the procedures of Example 6, but substituting t-amyl alcohol for t-butyl alcohol, there is obtained a mixture of acetone and ethanol. When an excess of acid is employed, a mixture of acetone, ethanol, acetic acid and some methanol is obtained.

EXAMPLE 8

A series of runs is carried out wherein 0.93 grams (0.01 moles) of 2-butylhydroperoxide (92 percent pure) is added dropwise with stirring to 5 cc of sulfuric acid of the following concentrations: 70, 80 and 96 percent while maintaining the temperature below 10°C. The mole percent yield of products is as follows:

| Concentration | Hydrogen (a) Migration | Ethyl (b) Migration | Methyl (c) Migration |
| --- | --- | --- | --- |
| 96 | 48 | 48 | 4 |
| 80 | 75 | 25 | 0 |
| 70 | 82 | 18 | 0 |

(a) 2-butanone resulting from hydrogen migration
(b) ethyl hydrogen sulfate and acetaldehyde resulting from ethyl migration
(c) methyl hydrogen sulfate and n-propanal resulting from methyl migration

EXAMPLE 9

In accordance with the procedures of Example 9, a series of runs is carried out with 3-pentylhydroperoxide in place of 2-butylhydroperoxide. The mole percent yield of products is as follows:

| Acid Concentration | Hydrogen (a) Migration | Ethyl (b) Migration |
| --- | --- | --- |
| 120 | 70 | 30 |
| 96 | 70 | 30 |
| 80 | 85 | 15 |
| 70 | 86 | 14 |

(a) 3-pentanone from hydrogen migration
(b) ethyl hydrogen sulfate and propanal from ethyl migration

The invention claimed is:

1. A process for the preparation of ketones and alcohols which comprises contacting a tertiary alkyl hydroperoxide or peroxide having from about 3 to 12 carbon atoms at a temperature of from about 0° to 20°C with an acid having a concentration of at least about 80 percent based on the weight of the total reaction mixture, wherein said acid is selected from the group consisting of hydrochloric, sulfuric, oleum, fluorosulfonic and perchloric acid.

2. The process according to claim 1 wherein the concentration of acid is at least about 96 percent.

3. The process according to claim 1 wherein the hydroperoxide is t-butylhydroperoxide and the product comprises a mixture of acetone and methanol.

4. The process according to claim 1 wherein the hydroperoxide is t-pentylhydroperoxide and the product comprises a mixture of acetone and ethanol.

5. The process according to claim 1 wherein the hydroperoxide is t-butylperoxide and the product comprises a mixture of acetone and methanol.

* * * * *